(12) United States Patent
Gumpoltsberger et al.

(10) Patent No.: US 8,206,257 B2
(45) Date of Patent: Jun. 26, 2012

(54) MULTI-SPEED TRANSMISSION

(75) Inventors: Gerhard Gumpoltsberger, Friedrichshafen (DE); Martin Brehmer, Tettnang (DE); Peter Ziemer, Tettnang (DE); Peter Tiesler, Meckenbeuren (DE); Gabor Diosi, Friedrichshafen (DE); Josef Haupt, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 539 days.

(21) Appl. No.: 12/538,941

(22) Filed: Aug. 11, 2009

(65) Prior Publication Data

US 2010/0041507 A1    Feb. 18, 2010

(30) Foreign Application Priority Data

Aug. 13, 2008  (DE) .................. 10 2008 041 192

(51) Int. Cl.
*F16H 3/62* (2006.01)
*F16H 3/44* (2006.01)
*F16H 37/06* (2006.01)

(52) U.S. Cl. ........ 475/288; 475/277; 475/278; 475/303; 475/311; 475/313; 475/323; 475/325; 475/330

(58) Field of Classification Search .......... 475/275–293, 475/311–313, 317–319, 323–325, 329, 330, 475/303
See application file for complete search history.

(56) References Cited

U.S. PATENT DOCUMENTS 4,038,888 A * 8/1977 Murakami et al. ............ 475/276
4,395,925 A    8/1983 Gaus
5,106,352 A    4/1992 Lepelletier
6,558,287 B2    5/2003 Hayabuchi et al.
6,572,507 B1    6/2003 Korkmaz et al.
6,634,980 B1   10/2003 Ziemer
6,860,831 B2    3/2005 Ziemer
6,955,627 B2   10/2005 Thomas et al.
6,960,149 B2   11/2005 Ziemer
6,991,578 B2    1/2006 Ziemer
7,549,942 B2    6/2009 Gumpoltsberger (Continued)

FOREIGN PATENT DOCUMENTS

DE    29 36 969 A1    4/1981

(Continued)

OTHER PUBLICATIONS

Gumpoltsberger, Gerhard: Synthesis of Planetary Transmissions, ZF Friedrichshafen AG, 2009, 13 pages, Germany.

(Continued)

*Primary Examiner* — Tisha Lewis
(74) *Attorney, Agent, or Firm* — Davis & Bujold, P.L.L.C.

(57) ABSTRACT

A multi-speed transmission having four gearsets, eight shafts and six shifting elements. The sun gear of gearset (P2) couples, via shaft (5) and brake (05), the housing (G), and, via clutch (15) the drive shaft. The carriers of gearsets (P2, P3) communicate, via shaft (4) and brake (04), with housing (G), and the sun gear of gearset (P3) communicates, via shaft (8) and clutch (18), with the drive shaft. The ring gears of gearsets (P2, P3) communicate, via shaft (6), with the ring gear of gearset (P4) and the sun gear of gearset (P1). The ring gear of gearset (P4) and the sun gear of gearset (P1) are connected with one another. The sun gear of gearset (P4) communicates, via shaft (3) and brake (03), with housing (G). The carriers of gearsets (P1, P4) communicate, via shaft (7) and clutch (17), with the drive shaft and the output shaft couples the ring gear of gearset (P1).

11 Claims, 3 Drawing Sheets

U.S. PATENT DOCUMENTS

| | | |
|---|---|---|
| 7,556,582 B2 | 7/2009 | Gumpoltsberger |
| 7,566,283 B2 | 7/2009 | Gumpoltsberger |
| 7,699,743 B2 | 4/2010 | Diosi et al. |
| 2004/0102278 A1* | 5/2004 | Usoro et al. ............ 475/275 |
| 2008/0161149 A1 | 7/2008 | Diosi et al. |
| 2009/0011891 A1 | 1/2009 | Phillips et al. |
| 2010/0048344 A1 | 2/2010 | Kamm et al. |
| 2011/0009228 A1 | 1/2011 | Bauknecht et al. |

FOREIGN PATENT DOCUMENTS

| | | |
|---|---|---|
| DE | 199 12 480 A1 | 9/2000 |
| DE | 199 49 507 A1 | 4/2001 |
| DE | 101 15 983 A1 | 10/2002 |
| DE | 101 15 987 A1 | 10/2002 |
| DE | 101 15 995 A1 | 10/2002 |
| DE | 102 13 820 A1 | 10/2002 |
| DE | 10 2005 010 837 A1 | 9/2005 |
| DE | 10 2004 040 597 A1 | 2/2006 |
| DE | 10 2005 002 337 A1 | 8/2006 |
| DE | 10 2005 010 210 A1 | 9/2006 |
| DE | 10 2005 032 881 A1 | 1/2007 |
| DE | 10 2006 006 622 A1 | 9/2007 |
| DE | 10 2006 006 636 A1 | 9/2007 |
| DE | 10 2006 006 637 A1 | 9/2007 |
| DE | 10 2008 000 428 | 2/2008 |
| DE | 10 2008 000 428.6 | 2/2008 |
| DE | 10 2008 007 574 A1 | 8/2008 |
| DE | 10 2008 016084 A1 | 10/2008 |
| EP | 0 434 525 A1 | 6/1991 |
| JP | 2005061445 A | 3/2005 |
| JP | 2006349153 A | 12/2006 |
| JP | 10 2006 006 637 A1 | 9/2007 |

OTHER PUBLICATIONS

Gumpoltsberger, Gerhard: Systematische Synthehse and Bewertung von mehrgangigen Plantengetriegen. Dissertation TU Chemnitz, 2007 das ges. Dokument insb. Kap. 1.2.

Gumpoltsberger, Gerhard: Systematic Synthesis and Evaluation of Multi-Stage Planetary Transmissions, Dissertation TU Chemnitz, 2007.

* cited by examiner

| GEAR | ENGAGED SHIFTING ELEMENTS ||||||  i  | phi |
|------|----|----|----|----|----|----|-------|--------|
|      | 03 | 04 | 05 | 15 | 17 | 18 |       |        |
| 1.   | ×  | ×  |    |    |    | ×  | 5.079 | 1.628  |
| 2.   | ×  |    | ×  |    |    | ×  | 3.120 | 1.536  |
| 3.   | ×  |    |    | ×  |    | ×  | 2.032 | 1.454  |
| 4.   | ×  |    |    |    | ×  | ×  | 1.397 | 1.397  |
| 5.   |    |    |    | ×  | ×  | ×  | 1.000 | 1.218  |
| 6.   |    |    | ×  |    | ×  | ×  | 0.821 | 1.129  |
| 7.   |    | ×  |    |    | ×  | ×  | 0.727 | 1.182  |
| 8.   |    | ×  | ×  |    | ×  |    | 0.615 | 1.214  |
| 9.   |    | ×  |    | ×  | ×  |    | 0.507 | 10.016 |
| R.   | ×  | ×  |    | ×  |    |    | -3.658| -0.720 | ns
MULTI-SPEED TRANSMISSION

This application claims priority from German patent application serial no. 10 2008 041192.2 filed Aug. 13, 2008.

FIELD OF THE INVENTION

The invention relates to a multi-step planetary transmission, in particular an automatic transmission for a motor vehicle.

BACKGROUND OF THE INVENTION

In the state of the art, automatic transmissions, particularly for motor vehicles, are comprised of planetary gear sets that are shifted by means of friction elements or, as the case may be, shifting elements such as clutches and brakes and are usually connected to a starting element that is subject to a slip effect and are optionally connected to a lockup clutch, such as a hydrodynamic torque converter or a fluid clutch.

Automatic transmissions of this kind are known, for example, from DE 199 49 507 A1 by the applicant: a multi-step transmission in which, on the driveshaft, two non-shiftable, front-mounted gear sets are provided, which on the output side produce two speeds, which in addition to the speed of the driveshaft, can optionally be shifted using a shiftable double planetary gear set that acts on the driveshaft by means of selective engagement of the shifting elements, so that in order to shift from one gear to the next higher or lower gear, only one of the two previously actuated shifting elements must in each case be engaged or disengaged. In this way, by using five shifting elements, seven forward gears can be achieved, and by using six shifting elements, nine or ten forward gears can be achieved.

Furthermore, from DE 102 13 820 A1, a multi-step automatic transmission with eight forward gears and one reverse gear is known, which comprises a first input path T1 of a first gear ratio; an input path T2 that has a greater gear ratio than the first input path T1; a planetary gear set of the Ravigneaux type with four elements, wherein the order of the four elements in a rotational speed diagram are: a first element, a second element, a third element, and a fourth element; a clutch C-2 that transmits rotation of the input path T2 to the first element S3; a clutch C-1 that transmits rotation of the input path T2 to the fourth element; a clutch C-4 that transmits rotation of the input path T1 to the first element; a clutch C-3 that transmits rotation of input path T1 to the second element C3; a brake B-1 that engages the fourth element; a brake B-2 that engages the second element; and an output element that is coupled to the third element S3.

Furthermore, a 9-gear multi-step transmission is known from DE 29 36 969 A1. It comprises eight shifting elements and four gear sets, wherein one gear set serves as a front-mounted transmission, and the main transmission has a Simpson set and an additional gear set that serves as a reversing gear.

Other multi-step transmissions are known from the applicant's DE 102005010210 A1 and DE102006006637 A1.

Automatically shiftable planetary vehicle transmissions in general have already been described many times in the state of the art and are subject to constant development and improvement. These transmissions should therefore require less complexity of construction, in particular a smaller number of shifting elements, and with sequential shifting, it should be possible to avoid double shifting, so that during shifting within defined gear groups, only one shifting element is engaged at any given time.

From the applicant's not yet published DE 102008000428.3, a multi-step planetary transmission is known, which has a drive and an output that are arranged in a housing. In the case of this known transmission, at least four planetary gear sets are provided, henceforth referred to as first, second, third, and fourth planetary gear set; at least eight rotatable shafts, henceforth referred to as driveshaft, output shaft, third, fourth, fifth, sixth, seventh, and eight shaft; as well as at least six shifting elements, comprising brakes and clutches, whose selective engagement produces different gear ratios between the drive and the output, so that preferably nine forward gears and one reverse gear can be achieved.

In this way, the first and the second planetary gear set, which are preferably designed as minus planetary gear sets, form a shiftable front-mounted gear set, and the third and the fourth planetary gear set form a main gear set.

In the known multi-step transmission, it is provided that the carriers of the first and second planetary gear set are coupled to each other via the fourth shaft, which is connected to an element of the main gear set; that the ring gear of the first planetary gear set is coupled to the sun gear of the second planetary gear set via the eighth shaft, which can be detachably connected via a first clutch with the driveshaft; and that the sun gear of the first planetary gear set can be coupled by means of the third shaft via a first brake to a housing and can be detachably connected via a second clutch with the driveshaft, in which case the ring gear of the planetary gear set can be coupled by means of the fifth shaft via a second brake to a housing of the transmission. In addition, the seventh shaft is permanently connected to at least one element of the main transmission and can be coupled via a third brake to a housing of the transmission, in which case the sixth shaft is permanently connected with at least one additional element of the main gear set and can be detachably connected via a third clutch with the driveshaft; the output shaft is permanently connected to at least one additional element of the third gear set.

In the known transmission, the fourth shaft is preferably permanently connected to the ring gear of the planetary gear set, in which case the sixth shaft is permanently connected to the ring gear of the fourth planetary gear set and the carrier of the third planetary gear set, and can be detachably connected via the third clutch to the driveshaft. In addition, the seventh shaft is permanently connected to the sun gears of the third and fourth planetary gear set and can be coupled via the third brake to a housing of the transmission. The output is supplied by means of the output shaft being permanently connected to the carrier of the fourth planetary gear set. In addition, the third and fourth planetary gear can be combined into, or, as the case may be, reduced to a Ravigneaux set with a common carrier and a common ring gear.

SUMMARY OF THE INVENTION

The object of the present invention is to propose a multi-step transmission of the type initially cited, which has at least nine forward gears and at least one reverse gear with sufficient gear ratio, in which the complexity of construction and installation size, in particular the installation length or, as the case may be, installation weight, are optimized, and in addition, the degree of efficiency is improved as far as drag and gearing loss are concerned. In addition, in the case of the multi-step transmission according to the present invention, there should be low torque ratios acting on the shifting elements. In particular, the transmission according to the present invention should be suitable for a front/transverse construction.

In them, a multi-step planetary transmission according to the present invention is disclosed, which has a drive and an output that are arranged in a housing. In addition, at least four planetary gear sets are provided, henceforth referred to as first, second, third, and fourth planetary gear set; at least eight rotatable shafts, henceforth referred to as driveshaft, output shaft, third, fourth, fifth, sixth, seventh, and eighth shaft; as well as at least six shifting elements comprising brakes and clutches, whose selective engagement produces different gear ratios between the drive and the output, so that preferably nine forward gears and one reverse gear can be achieved. The second and third planetary gear set are preferably combined into, or, as the case may be, reduced to one Ravigneaux set with a common carrier and a common ring gear.

According to the present invention, the second and the third planetary gear set form a shiftable front-mounted gear set, wherein the first and the fourth planetary gear set form the main gear set, in which the sun gear of the second planetary gear set, by means of the fifth shaft, can be coupled via a first brake to the housing and can be detachably connected via a first clutch with the driveshaft, in which case the carriers of the second and third planetary gear set can be coupled by means of the fourth shaft via a second brake to the housing, and the sun gear of the third planetary gear set can be detachably connected via the eighth shaft and a second clutch to the driveshaft.

Furthermore, the ring gears of the second and third planetary gear set are connected by means of the sixth shaft with the ring gear of the fourth planetary gear set and the sun gear of the first planetary gear set; the ring gear of the fourth planetary gear set and the sun gear of the first planetary gear set are connected to one another. According to the present invention, the sun gear of the fourth planetary gear set can be coupled by means of the third shaft via a third brake to a housing of the transmission, in which case the carriers of the first and the fourth planetary gear set can be detachably connected to the driveshaft by means of the seventh shaft and a third clutch, and in which case the driveshaft is connected to the ring gear of the first planetary gear set.

The embodiment according to the present invention of the multi-step transmission produces gear ratios that are suitable particularly for passenger cars, as well as produce a considerable increase in the overall transmission ratio spread of the multi-step transmission, which results in improved driving comfort and a significant reduction in consumption.

In addition, with the multi-step transmission according to the present invention, the complexity of construction is considerably reduced due to the small number of shifting elements. With the multi-step transmission according to the present invention, it is advantageously possible to start the vehicle with a hydrodynamic converter, an external starting clutch, or with other suitable external starting elements. It is also potentially possible to enable a starting operation by means of a starting element that is integrated into the transmission. A shifting element is preferred that is actuated in a first forward gear and in reverse gear.

What is more, with the multi-step transmission according to the present invention, there is a good degree of efficiency in the main driving gears with regard to drag and gearing losses.

Furthermore, there are low torque ratios in the shifting elements and in the planetary gear sets of the multi-step transmission, which advantageously reduces wear in the multi-step transmission. In addition, the low torque ratios allow correspondingly smaller dimensions, which leads to a reduction in the required installation space and a corresponding reduction in the costs. Moreover, there are also low speeds in the shafts, the shifting elements, and the planetary gear sets.

Besides, the transmission according to the present invention is conceived in such a way that it can be adapted to different drivetrain embodiments, both as regards the direction of power flow and also in terms of dimensions.

BRIEF DESCRIPTION OF THE DRAWINGS

The invention will be described in more detail below on the basis of the figures. They show.

DETAILED DESCRIPTION OF THE PREFERRED EMBODIMENTS

Figure 1:
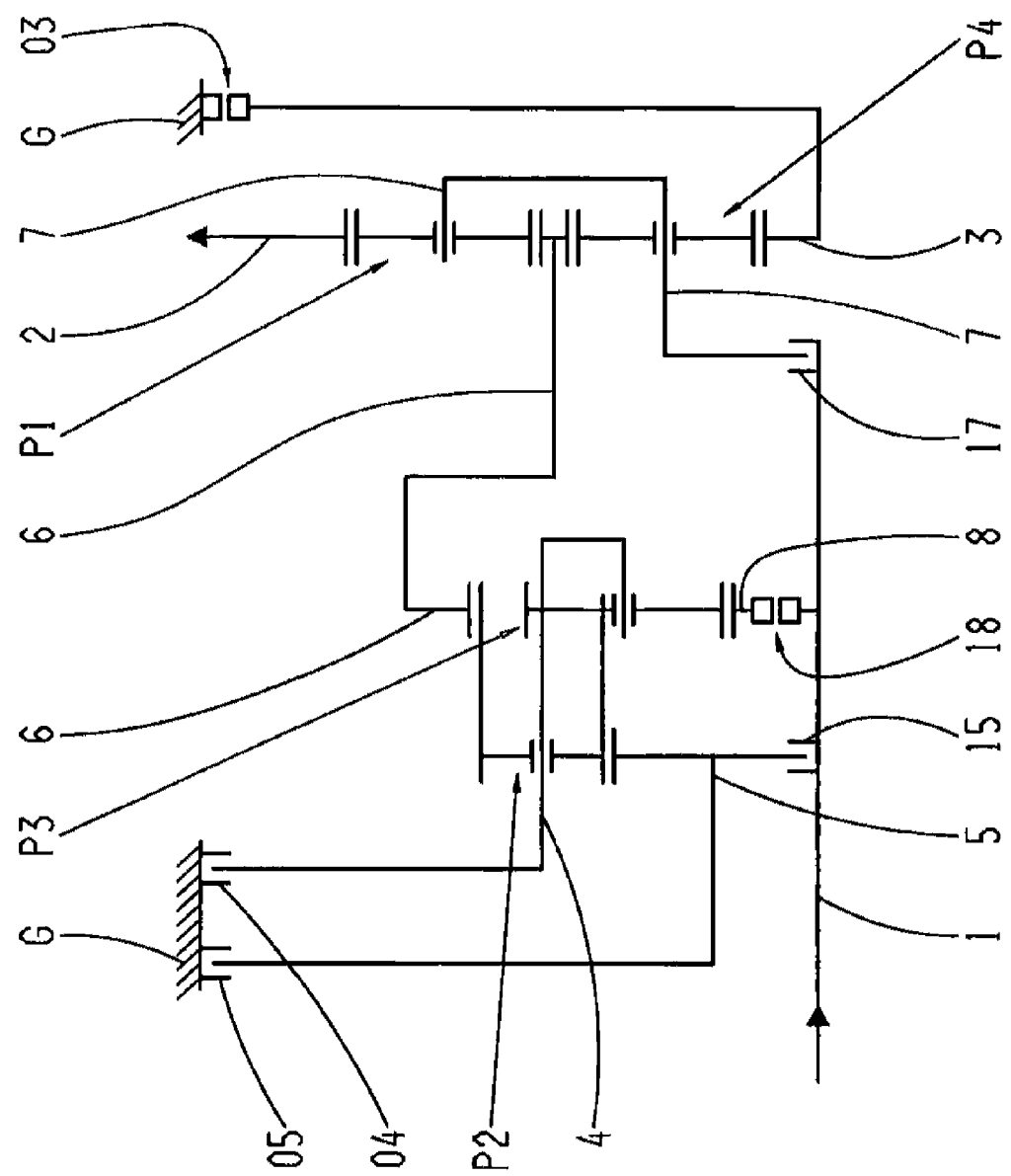
FIG. 1: A schematic view of a preferred embodiment of a multi-step transmission according to the present invention.

FIG. 1 illustrates a multi-step transmission according to the present invention with a driveshaft 1, an output shaft 2, and four planetary gear sets P1, P2, P3, and P4, which are arranged in a housing G. In this case, the second and third planetary gear set P2, P3 form a shiftable front-mounted gear set; the first and the fourth planetary gear set P1, P4 form the main gear set.

Here the first, the second, and the fourth planetary gear set are designed as minus planetary gear sets, in which the third planetary gear set P3 is designed as a plus planetary gear set. As is known, a simple minus planetary gear set comprises a sun gear, a ring gear, and a carrier, on which the planet gears, which mesh respectively with sun gear and ring gear, are rotatably mounted. In this way, the ring gear, with the carrier held in place, rotates in the opposite direction of the sun gear. In contrast, a simple plus planetary gear set comprises a sun gear, a ring gear, and a carrier, on which internal and external planet gears are rotatably mounted, in which case all internal planet gears mesh with the sun gear and all external planet gears with the ring gear, in which case each internal planet gear respectively meshes with one external planet gear. In this way, the ring gear, with the carrier held in place, has the same direction of rotation as the sun gear.

In the example shown in FIG. 1, the second and the third planetary gear set P2, P3 are combined into, or, as the case may be, reduced to one Ravigneaux set with a common carrier and a common ring gear.

According to further embodiments, the planetary gear sets P2 and P3 can be designed as separate planetary gear sets. In the shown exemplary embodiment, which is particularly suitable for a front/transverse design, the planetary gear sets P1, P4, which form the main set, seen axially, are arranged on the same gear set level, in which case the first planetary gear set P1, seen radially, is arranged above the fourth planetary gear set P4, which results in the total of four planetary gear sets P1, P2, P3, P4, seen in spatial terms from an axial perspective, are limited to three gear-set levels. Here, the ring gear of the fourth planetary gear set P4 is connected to the sun gear of the first planetary gear set P1.

As can be seen from FIG. 1, six shifting elements are provided, namely three brakes 03, 04, 05, and three clutches

15, 17, and 18. The spatial arrangement of the shifting elements can be arbitrary and is only limited by the dimensions and external shape.

With these shifting elements, selective shifting of nine forward gears and one reverse gear can be achieved. The multi-step transmission according to the present invention has a total of eight rotatable shafts, namely the shafts 1, 2, 3, 4, 5, 6, 7, and 8, in which case the driveshaft comprises the first shaft and the output shaft the second shaft of the transmission.

According to the present invention, in the multi-step transmission according to FIG. 1, it is provided that the sun gear of the second planetary gear set P2 can be coupled by means of the fifth shaft 5 via a first brake 05 to the housing G of the transmission and detachably connected via first clutch 15 to the driveshaft 1, in which case the carrier of the Ravigneaux set, or, as the case may be, the carrier of the second and the third planetary gear set P2, P3, can be coupled by means of the fourth shaft 4 via a second brake 04 to the housing G of the transmission. Furthermore, the sun gear of the third planetary gear set P3 can be detachably connected via the eighth shaft 8 and a second clutch 18 to the driveshaft 1.

According to the invention, the ring gear of the Ravigneaux set, or, as the case may be, the ring gears of the second and third planetary gear set P2, P3, are connected by means of the sixth shaft 6 to the ring gear of the fourth planetary gear set P4 and the sun gear of the first planetary gear set P1, in which case the ring gear of the fourth planetary gear set P4 and the sun gear of the first planetary gear set P1 are preferably connected to one another by means of gear teeth. Furthermore, the sun gear of the fourth planetary gear set P4 can be coupled by means of the third shaft 3 via a third brake 03 to the housing G of the transmission, in which case the carriers of the first and the fourth planetary gear set P1, P4 are detachably connected by means of the seventh shaft 7 and a third clutch 17 to the driveshaft 1, and in which case the output shaft 2 is connected to the ring gear of the first planetary gear set P1.

Seen radially, the first clutch 15 is preferentially arranged below the second planetary gear set P2; the second clutch 18, seen radially, is arranged below the third planetary gear set P3. In addition, the first and second brake 05, 04, seen axially, are arranged side by side, in which case the three clutches 15, 18, and 17, seen axially, are arranged in the order: "first clutch 15—second clutch 18—third clutch 17."

Figures 2, 3:
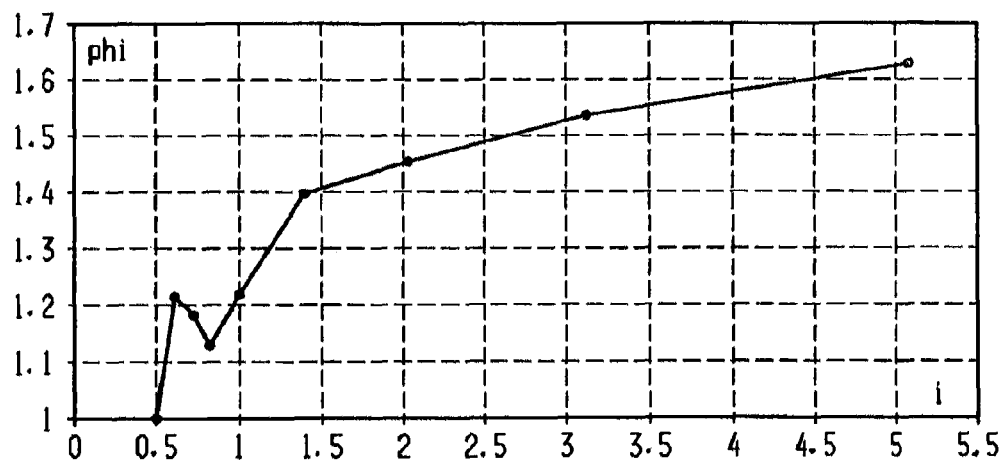
FIG. 2: An example of a shift pattern for a multi-step transmission according to FIG. 1, FIG. 3: A diagram illustrating the progressive ratio phi corresponding to a respective transmission ratio i of a gear in the transmission shown in FIG. 1.

FIG. 2 shows an exemplary shift pattern of a multi-step transmission according to FIG. 1. For each gear, three shifting elements are engaged. The respective ratios i of the individual gear ratios and the gear transmissions determined on that basis, or, as the case may be, the progressive ratios phi to the next higher gear, can be derived from the shift pattern, in which case the value 10.016 represents the spread.

Typical values for the standard ratios of the planetary gear sets P1, P2, P3, and P4 are respectively −1.60, −1.80, 2.50, and −2.20. It can be seen from FIG. 2 that by shifting sequentially, double shifts, or, as the case may be, group shifts, can be avoided, because two adjacent gear ratios use two shifting elements in common, in which case a total of nine forward gears and one reverse gear can be achieved. It is also seen that a wide spread is achieved with small gear transition ratios.

The second clutch 18 and/or the third brake 03 are preferably designed as claw-type shifting elements. That reduces the drag torque of the transmission, which is generated due to the short distance between the friction surfaces of a frictional shifting element in an unengaged state and the oil, or, as the case may be, the air/oil mixture contained in it. The other clutches 15, 17 and the other brakes 04, 05 are preferably designed as frictional shifting elements, or as the case may be disk shifting elements.

The first forward gear is produced by engaging the second clutch 18 and the second and third brake 04 and 03; the second forward gear by engaging the first and third brake 05, 03, and the second clutch 18; the third forward gear by engaging the third brake 03 and the first and second clutch 15, 18; the fourth forward gear by engaging the third brake 03 and the third and second clutch 17, 18; the fifth forward gear by engaging the three clutches 15, 17, and 18; the sixth forward gear by engaging the brake 05 and the third and second clutch 17, 18; the seventh forward gear by engaging the second brake 04 and the third and second clutch 17, 18; the eighth forward gear by engaging the first and second brake 05, 04 and the third clutch 17; and the ninth forward gear is achieved by engaging the second brake 04 and the first and third clutch 15, 17.

As can be seen from the shift pattern, the reverse gear is achieved by engaging the third and second brake 03, 04 and the first clutch 15.

Because the third and second brake 03, 04 are engaged in the first forward gear and in the reverse gear, these shifting elements (designed as frictional shifting elements, or, as the case may be, as disk shifting elements) can be used as starting elements.

According to the present invention, different gear transition ratios can also be produced using the same shift pattern, depending on the gearshift logic, thereby enabling variations specific to use, or, as the case may be, vehicle.

A diagram illustrating the progressive ratio phi corresponding to the respective gear ratio i of a gear for the transmission shown in FIG. 1 that corresponds to the values shown in FIG. 2 is the subject of FIG. 3.

Figure 4:
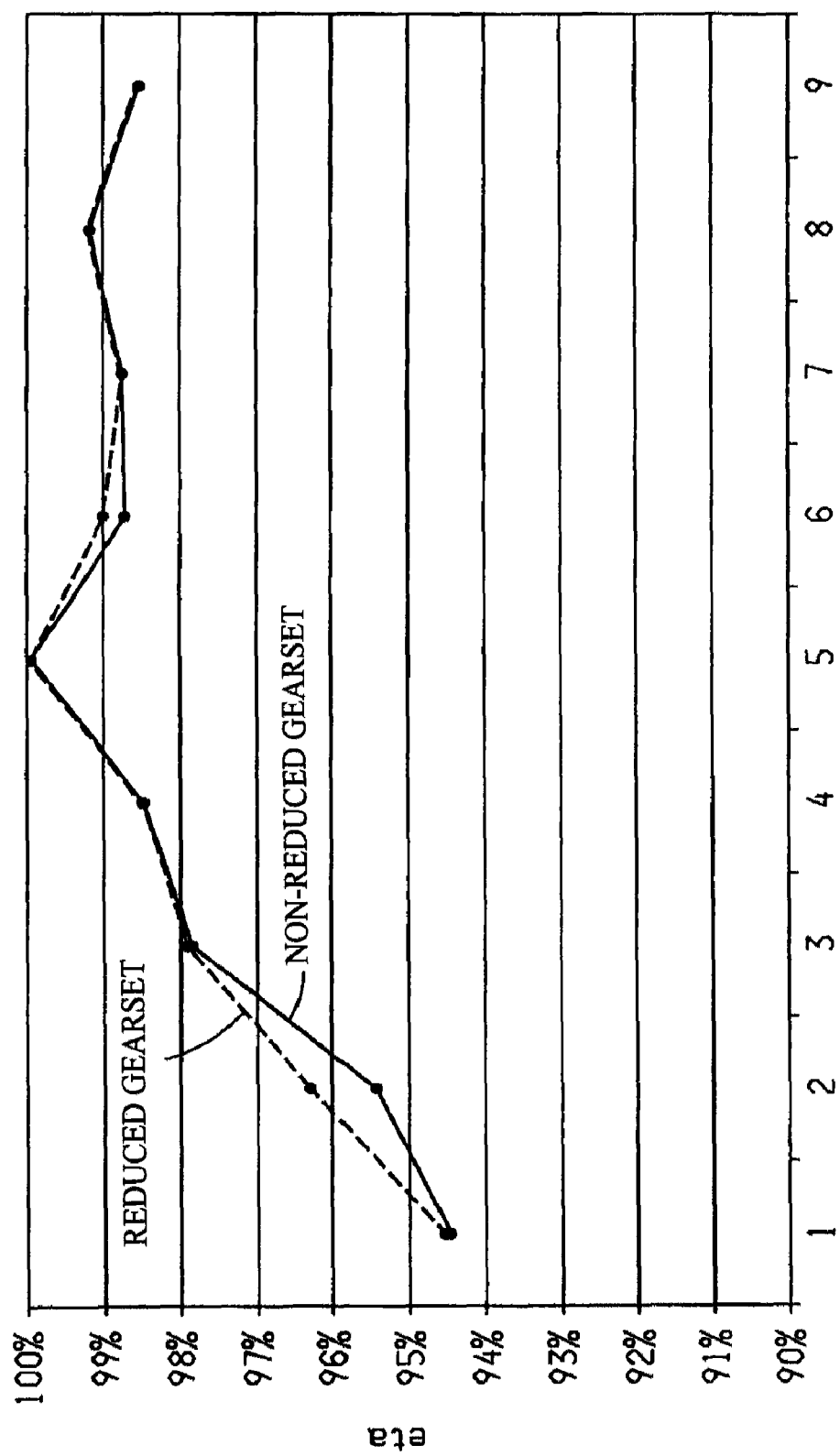
FIG. 4: A diagram illustrating the degree of efficiency corresponding to the respective gear for the transmission shown in FIG. 1.

On the basis of the diagram shown in FIG. 4, which shows the degree of efficiency eta depending on the respective gear of an transmission according to the present invention, it is obvious that the configuration of the second and the third planetary gear set as a Ravigneaux set results in an improvement in the degree of efficiency in the second and in the sixth forward gear.

According to the present invention, it is possible to provide additional freewheels at any suitable site in the multi-step transmission, for example between a shaft and the housing, or for the purpose of connecting two shafts, if required.

According to the present invention, an axle differential and/or a distributor differential can be arranged on the drive side or on the output side.

In the context of an advantageous further development, the driveshaft 1 can be disconnected from a drive engine by means of a clutch element, as required, in which case a hydrodynamic converter, a hydraulic clutch, a dry starting clutch, a wet starting clutch, a magnetic powder clutch, or a centrifugal clutch can be used as a coupling element. It is also possible to arrange a starting element of that type in the direction of the power flow behind the transmission, in which case the driveshaft 1 is permanently connected to the crankshaft of the engine.

What is more, the multi-step transmission according to the present invention enables the arrangement of a torsion vibration damper between the engine and the transmission.

In the context of an additional embodiment of the invention, which is not shown, a wear-free brake, for example a hydraulic or electric retarder or similar, can be arranged on each shaft, preferably on the driveshaft 1, which is particularly significant for use in commercial motor vehicles. Furthermore, a power take-off can be provided for driving additional assemblies on each shaft, preferably on the driveshaft 1 or the output shaft 2.

The frictional shifting elements employed in the design can be power shift clutches or brakes. In particular, friction-locking clutches or brakes can be used, such as disk clutches, band brakes, and/or conical clutches.

An additional advantage of the multi-step transmission presented here is that an electric machine can be mounted on each shaft as a generator and/or additional electrical machine.

It is self-evident that every constructive variation, in particular every spatial arrangement of the planetary gear set and the shifting elements as such and in relation to each other, as far as technically feasible, is covered by the scope of protection of the existing claims, without influencing the function of the transmission as specified in the claims, even if these variations are not explicitly illustrated in the figures or mentioned in the description.

Reference Numerals
1 first shaft, driveshaft
2 second shaft, output shaft
3 third shaft
4 fourth shaft
5 fifth shaft
6 sixth shaft
7 seventh shaft
8 eighth shaft
03 third brake
04 second brake
05 first brake
15 first clutch
17 third clutch
18 second clutch
P1 first planetary gear set
P2 second planetary gear set
P3 third planetary gear set
P4 fourth planetary gear set
i gear ratio
phi progressive ratio
G housing
eta degree of efficiency

The invention claimed is:

1. A multi-speed planetary transmission for a motor vehicle, the transmission comprising:
an input drive shaft (1) and an output shaft (2);
first, second, third and fourth planetary gear sets (P1, P2, P3, P4) being arranged within a housing (G), each of the first planetary gear set (P1), the second planetary gear set (P2), the third planetary gear set (P3) and the fourth planetary gear set (P4) having a sun gear, a carrier and a ring gear;
at least third, fourth, fifth, sixth, seventh and eighth rotatable shafts (3, 4, 5, 6, 7, 8);
six shifting elements (03, 04, 05, 15, 17, 18) comprising first, second and third brakes (05, 04, 03) and first, second, and third clutches (15, 18, 17), and selective engagement of the six shifting elements (03, 04, 05, 15, 17, 18) achieves different gear ratios between the drive shaft (1) and the output shaft (2) such that nine forward gears and one reverse gear can be implemented;
the second planetary gear set (P2) and the third planetary gear set (P3) comprising a shiftable front-mounted gear set, and the first planetary gear set (P1) and the fourth planetary gear set (P4) comprising a main gear set;
the sun gear of the second planetary gear set (P2) is coupled to the fifth shaft (5), and is connectable, via the first clutch (15), to the drive shaft (1), and the fifth shaft (5) is connectable, via the first brake (05), to the housing (G) of the transmission;
the carrier of the second planetary gear set (P2) and the carrier of the third planetary gear set (P3) are coupled to the fourth shaft (4), and the fourth shaft (4) is connectable, via the second brake (04), to the housing (G) of the transmission;
the sun gear of the third planetary gear set (P3) is coupled to the eighth shaft (8), and the eighth shaft (8) is connectable, via the second clutch (18), to the drive shaft (1);
the ring gear of the second planetary gear set (P2) and ring gear of the third planetary gear set (P3) are coupled, via the sixth shaft (6), to the ring gear of the fourth planetary gear set (P4) and the sun gear of the first planetary gear set (P1);
the ring gear of the fourth planetary gear set (P4) is coupled to the sun gear of the first planetary gear set (P1);
the sun gear of the fourth planetary gear set (P4) is coupled to the third shaft (3), and the third shaft (3) is connectable, via the third brake (03), to the housing (G) of the transmission;
the carrier of the first planetary gear sets (P1) and the carrier of the fourth planetary gear set (P4) are coupled to the seventh shaft, and the seventh shaft (7) is connectable, via the third clutch (17), to the drive shaft (1); and
the ring gear of the first planetary gear set (P1) is coupled to the output shaft (2).

2. The multi-speed transmission according to claim 1, wherein the second planetary gear set (P2) and the third planetary gear set (P3) form one Ravigneaux set with a common carrier and a common ring gear, the carrier of the Ravigneaux set is coupled to the fourth shaft (4), and the ring gear of the Ravigneaux set is coupled to the sixth shaft (6), and the sixth shaft (6) is coupled to the ring gear of the fourth planetary gear set (P4) and the sun gear of the first planetary gear set (P1).

3. The multi-speed transmission according to claim 1, wherein the first planetary gear set (P1), the second planetary gear set (P2), and the fourth planetary gear set (P1, P2, P4) are minus planetary gear sets, and the third planetary gear set (P3) is a plus planetary gear set.

4. The multi-speed transmission according to claim 1, wherein the first planetary gear set (P1) and the fourth planetary gear set (P4) form the main gear set and are axially arranged on a same gear set level with the first planetary gear set (P1) radially arranged about the fourth planetary gear set (P4) such that the first planetary gear set (P1), the second planetary gear set (P2), the third planetary gearset (P3) and the fourth planetary gear set (P4) are limited, in spatial terms, to three gear set levels when viewed axially.

5. The multi-speed transmission according to claim 1, wherein the first clutch (15) is arranged radially inwardly of the second planetary gear set (P2).

6. The multi-speed transmission according to claim 1, wherein the second clutch (18) is arranged radially inwardly of the third planetary gear set (P3).

7. The multi-speed transmission according to claim 1, wherein the first clutch (15), the second clutch (18) and the third clutch (17) are axially arranged in an order of:
the first clutch (15),
the second clutch (18) and
the third clutch (17).

8. The multi-speed transmission according to claim 1, wherein the first brake (05) and the second brake (04) are arranged axially side by side.

9. The multi-speed transmission according to claim 1, wherein at least one of the second clutch (18) and the third brake (03) is a claw shifting element and a remainder of the six shifting elements (03, 04, 05, 15, 17, 18) are frictional shifting elements.

10. The multi-speed transmission according to claim 1, wherein
- a first forward gear is implemented by engagement of the second clutch (18), the second brake (04) and the third brake (03);
- a second forward gear is implemented by engaging the first brake (05), the third brake (03) and the second clutch (18);
- a third forward gear is implemented by engaging the third brake (03), the first clutch (15) and the second clutch (18);
- a fourth forward gear is implemented by engaging the third brake (03), the third clutch (17) and the second clutch (18);
- a fifth forward gear is implemented by engaging the first clutch (15), the second clutch (18) and the third clutch (17);
- a sixth forward gear is implemented by engaging the first brake (05), the third clutch (17) and the second clutch (18);
- a seventh forward gear is implemented by engaging the second brake (04), the third clutch (17) and the second clutch (18);
- an eighth forward gear is implemented by engaging the first brake (05), the second brake (04) and the third clutch (17);
- a ninth forward gear is implemented by engaging the second brake (04), the first clutch (15) and third clutch (17); and
- the reverse gear is implemented by engaging the third brake (03), the second brake (04) and the first clutch (15).

11. The multi-speed transmission according to claim 1, wherein either the third brake (03) or the second brake (04) of the transmission provides a starting operation of the transmission.

* * * * *